B. T. Hall,
Water Wheel.

Nº 11,373.    Patented July 25, 1854.

UNITED STATES PATENT OFFICE.

BENAJAH T. HALL, OF SENECA FALLS, NEW YORK.

IMPROVED WATER-WHEEL.

Specification forming part of Letters Patent No. 11,373, dated July 25, 1854.

*To all whom it may concern:*

Be it known that I, BENAJAH T. HALL, of Seneca Falls, in the county of Seneca and State of New York, have invented a new and useful Improvement upon Central-Discharge Water-Wheels; and I do hereby declare that the following is a full and exact description, reference being had to the annexed drawings, in which—

Figure 1:
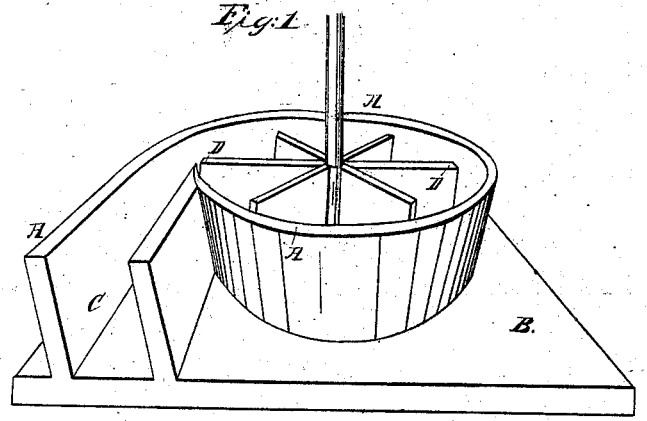

Figure 1 is a perspective of the wheel as improved, with the top or cover removed to show the interior. Fig. 3 is a plan, and Fig. 2 is a vertical section through the middle.

The same letters refer to like parts in each.

My first improvement has for its object to carry the water around the periphery of the wheel and within the curb in a compact and unbroken mass.

Figure 2:
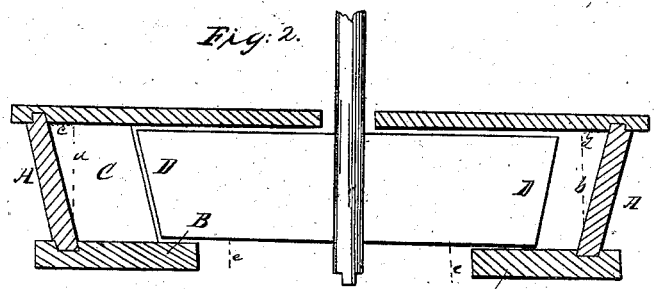
Figure 3:
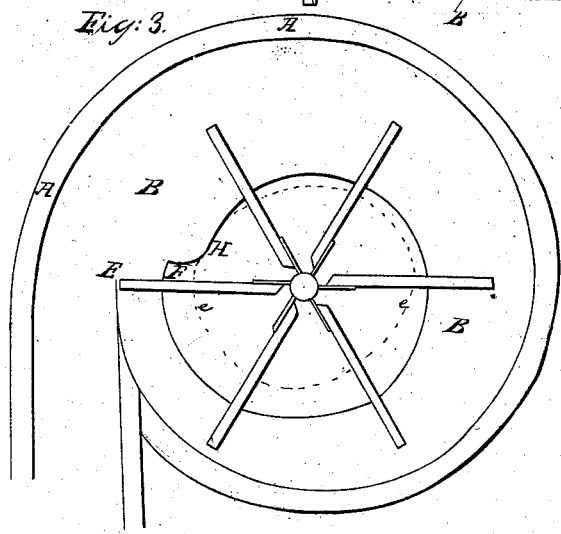

As the central discharge-wheel has heretofore been constructed, the curb A A A has been made perpendicular to the base B B, as shown by the dotted lines *a* and *b*, Fig. 2. The water on its passage around the curb, being acted upon by its own gravity and a varying centrifugal force, was broken into a confused mass, and part of it descending through the central discharge it exerted but little beneficial effect on the wheel at more than two-thirds of its distance around the circumference. After many experiments I have fully succeeded in remedying this defect. I give to the sides of the curb an inclination outward, as shown in Figs. 1 and 2, sufficient to counteract the effect of gravity by partly supporting the column of water and carrying it in an unbroken mass around the whole circumference of the wheel. The amount of this bevel or inclination should of course vary, diminishing in proportion to the head of water.

The drawings represent a wheel of four and one-half feet in diameter used under a head of eight feet. The curb is seventeen inches in height and the inclination from a perpendicular (represented by the lines *c* and *d*, Fig. 2) is four inches. This I have found to be sufficient by practical experiment, and for each foot of variation from it in the head of the water-power I would make a corresponding change of one-fourth of an inch in the inclination.

In connection with the beveled curb I make the sides of the chute which conduct the water to the wheel inclined also and to the same extent as is represented at C, Figs. 1 and 2, and the ends of the buckets, instead of being perpendicular, are made parallel with a vertical section of the curb, as shown at D D, Fig. 2.

A second improvement has reference to the orifice for discharging the water after its action on the wheel. This has heretofore been made circular, as represented by the dotted lines *e e e*, Figs. 2 and 3, and the wheel has been obstructed by a mass of water which had exerted its full force upon the buckets of the wheel and yet retained sufficient centrifugal force to retain it upon the base. This difficulty I have remedied by enlarging the discharging-orifice in proportion to the tendency of the dead water to accumulate. The manner of constructing it will be manifest from an inspection of Fig. 3. First a circle is described of about thirty inches in diameter, like that which has heretofore been used for the discharging-orifice. At the point E, where the bucket comes nearest in contact with the curb, divide equally the distance from the curb to the circle, and with that F for a starting-point describe a curve uniformly approaching the circle, and so as to intersect it at the point H, distant about six inches from the place of beginning. The included portion being cut away will leave a proper discharge for the water.

By the improvement above specified a gain of from fifteen to twenty per cent. has been effected in the power of the much-approved central discharge-wheel.

What I claim as my invention, and desire to secure by Letters Patent, is—

1. The combination of the beveled or inclined curb, constructed as above described, with the central-discharge water-wheel.

2. The eccentric discharging-orifice or its equivalent, for the purposes above set forth.

BENAJAH T. HALL.

Witnesses:
ELISHA FOOTE,
CHAS. BEARY.